US007749480B2

(12) United States Patent
Audet et al.

(10) Patent No.: US 7,749,480 B2
(45) Date of Patent: Jul. 6, 2010

(54) CADMIUM TELLURIDE PRODUCTION PROCESS

(75) Inventors: Nicholas Audet, Montreal (CA); Blagovest Levitcharsky, Saint-Laurent (CA)

(73) Assignee: 5N Plus Inc., Ville Saint-Laurent, Quebec (CA)

(*) Notice: Subject to any disclaimer, the term of this patent is extended or adjusted under 35 U.S.C. 154(b) by 0 days.

(21) Appl. No.: 12/367,105

(22) Filed: Feb. 6, 2009

(65) Prior Publication Data
US 2010/0080750 A1 Apr. 1, 2010

Related U.S. Application Data

(60) Provisional application No. 61/101,294, filed on Sep. 30, 2008.

(51) Int. Cl.
C01B 19/04 (2006.01)
(52) U.S. Cl. ..................................................... 423/509
(58) Field of Classification Search ................... 423/509
See application file for complete search history.

(56) References Cited

U.S. PATENT DOCUMENTS

| | | | |
|---|---|---|---|
| 3,494,730 A | 2/1970 | Tai et al. |
| 4,566,918 A | 1/1986 | Irvine et al. |
| 4,650,539 A | 3/1987 | Irvine et al. |
| 4,824,520 A | 4/1989 | Morrison |
| 4,828,648 A | 5/1989 | La Chapelle, Jr. et al. |
| 4,906,325 A | 3/1990 | Bernardi |
| 4,911,905 A | 3/1990 | Weirauch |
| 4,971,663 A | 11/1990 | Sadoway et al. |
| 4,992,303 A | 2/1991 | Whiffin et al. |
| 5,131,975 A | 7/1992 | Bourret-Courchesne |
| 5,201,985 A | 4/1993 | Medvedieff |
| 5,312,506 A | 5/1994 | Omino |
| 5,484,736 A | 1/1996 | Hasoon et al. |
| 5,513,834 A | 5/1996 | Feldewerth et al. |
| 5,578,502 A | 11/1996 | Albright et al. |
| 5,603,763 A | 2/1997 | Taniguchi et al. |
| 5,871,580 A | 2/1999 | Asahi et al. |
| 5,911,824 A | 6/1999 | Hammond et al. |
| 5,989,933 A | 11/1999 | Bevan et al. |
| 6,036,770 A | 3/2000 | Chandra et al. |
| 6,093,245 A | 7/2000 | Hammond et al. |
| 6,524,966 B1 | 2/2003 | Wright et al. |
| 7,001,849 B2 | 2/2006 | Wright et al. |
| 7,014,702 B2 | 3/2006 | Zappettini et al. |
| 7,175,705 B2 | 2/2007 | Fujimura et al. |
| 7,211,142 B2 | 5/2007 | Hirano |
| 7,393,516 B2 | 7/2008 | Seo et al. |
| 7,427,382 B2 | 9/2008 | Redden et al. |
| 2007/0036700 A1 | 2/2007 | Redden et al. |
| 2007/0189359 A1 | 8/2007 | Chen et al. |
| 2007/0197022 A1 | 8/2007 | Hails et al. |
| 2007/0235653 A1 | 10/2007 | Buckle et al. |
| 2007/0266826 A1 | 11/2007 | Sanjurjo et al. |
| 2008/0112878 A1 | 5/2008 | Kardokus et al. |
| 2008/0153268 A1 | 6/2008 | Johnston et al. |

FOREIGN PATENT DOCUMENTS

| | | |
|---|---|---|
| CA | 2007464 | 7/1990 |
| CA | 2025119 | 3/1991 |
| CA | 2168229 | 2/1995 |
| CA | 2134631 | 5/1995 |
| CA | 2292853 | 6/2000 |
| CA | 2478894 | 9/2003 |
| CA | 2510415 | 12/2006 |
| EP | 0295659 | 12/1988 |
| EP | 0311038 | 4/1989 |
| JP | 56-32310 A * | 4/1981 |
| WO | 2005098097 | 10/2005 |
| WO | 2006013344 | 2/2006 |
| WO | 2007120905 | 10/2007 |

OTHER PUBLICATIONS

Z. Djuric, English Abstract of "Isothermal vapour-phase epitaxy of mercury-cadmium telluride (Hg,Cd)Te", Journal of Materials Science: Materials in Electronics, Aug. 1995, pp. 187-218, vol. 6, No. 4, Yugoslavia.
N. Audet, Composition Study of CdTe Charges Synthesized by the Travelling Heater Method, IEEE Transactions on Nuclear Science, Aug. 2007, pp. 782-785, vol. 54, No. 4.
Renyi Hou, English Abstract of CN 101125679, "Method for Preparing Highly Pure Cadmium Telluride", Feb. 20, 2008, CN.
Hesheng Xia, English Abstract of CN 101159294A, "Cadmium telluride Thin Film Used for Solar Cell and Preparation Method Thereof", Apr. 9, 2008, CN.
Higuchi Hiroshi et al, English Abstract of JP 11340487, "Method and System for Producing Cadmium Telluride for Solar Cell", Dec. 10, 1999, JP.
Mouri Kenzou et al., English Abstract of JP60141606, "Preparation of Cadmium Telluride Powder", Jul. 26, 1985, JP.
Vishwanath Kumar, Thesis on "Characterization of Large Area Cadmium Telluride Films and Solar Cells Deposited on Moving Substrates by Close Spaced Sublimation", University of South Florida, Nov. 2003, pp. 1-66, U.S.A.
Zaiour, A. et al., "Purification of Tellurium to Nearly 7N Purity", Materials Science & Engineering, 2006, pp. 54-61, B 131.
Wu Hongcai, English Abstract of CN 1380246 "Preparation Method of Cadmium Antimonide Powder", Nov. 20, 2002, CN.
Nakayama Nobuo et al., English Abstract of JP 56032310, "Manufacture of Cadmium Telluride", Apr. 1, 1981, JP.
Zha et al., Article "Heat Treatment in Semi-Closed Ampoule for Obtaining Stoichiometrically Controlled Cadmium Telluride", Journal of Crystal Growth, 2002, pp. 1720-1725.

(Continued)

*Primary Examiner*—Timothy C Vanoy
(74) *Attorney, Agent, or Firm*—Bereskin & Parr LLP/S.E.N.C.R.L.s.r.l.

(57) ABSTRACT

A method for producing cadmium telluride from elemental cadmium and elemental tellurium is disclosed. For example, the method disclosed can be used for producing multi-kilogram batches of cadmium telluride in a few hours.

33 Claims, No Drawings

OTHER PUBLICATIONS

An English abstract of JP 60-141606, "Preparation of Cadmium Telluride Powder", M. Kenzou et al., published Jul. 26, 1985.

N. Audet et al. "Synthesis of Ultra-High Purity CdTe Ingots by the Traveling Heater Method", Journal of Electronic Materials, Jan. 2005, pp. 683-686, vol. 34, No. 6.

N. Audet et al., "Traveling Heater Method Preparation and Composition Analysis of CdTe Ingots", Journal of Electronic Materials, Jan. 2005, pp. 687-692, vol. 34, No. 6.

A.G. Fisher, "Techniques for Melt-Growth of Luminescent Semiconductor Crystals under Pressure", Journal of the Electrochemical Society, Feb. 1970, pp. 41C-47C, vol. 117, No. 2.

A. Zappettini et al., "A New Process for Synthesizing High-Purity Stoichiometric Cadmium Telluride", Journal of Crystal Growth, 2000, pp. 14-18, 214/215.

Y.C. Liu et al. "A Numerical Simulation Study for the Zone Refining Processes of Cadmium and Tellurium", Int. J. Materials and Product Technology, 2008, pp. 1-19, vol. 32, No. 1.

S.A. Medvedev et al., "Synthesis and Directed Crystallization of Cadmium Telluride in the Presence of a Controllable Deviation from the Stoichiometry", 1968, UDC 546, 48'214:548.55, pp. 1759-1761.

R. Triboulet, "Fundamentals of the CdTe Synthesis", Journal of Alloys and Compounds, 2004, pp. 67-71, 371.

* cited by examiner

CADMIUM TELLURIDE PRODUCTION PROCESS

CROSS-REFERENCE TO RELATED APPLICATION

The present application claims priority on U.S. provisional application No. 61/101,294 filed on Sep. 30, 2008, which is incorporated herein by reference in its entirety.

FIELD OF THE DISCLOSURE

The present disclosure relates to the field of production of cadmium telluride. More specifically, the disclosure relates to a method of producing cadmium telluride by using elemental cadmium and elemental tellurium as starting material.

BACKGROUND OF THE DISCLOSURE

Current published and available processes for the production of cadmium telluride from elemental cadmium and tellurium tend to use limited quantities of material and considerably long reaction times. These are reported to be required so as to limit the possibility of hazardous, high pressure conditions being generated due to locally high temperatures, which are the result of the highly exothermic reaction that occurs between elemental cadmium and tellurium to form cadmium telluride. Typically, these processes do not permit to obtain a production of more than about few hundreds of grams per day to about 5 kilograms per day. These processes clearly do not allow for the production of more than about 5 kilograms or about 10 kilograms per day.

It is quite apparent that it would be highly desirable to be provided with a substantially non-hazardous method for producing relatively large quantities of CdTe (cadmium telluride) in relatively short periods of time. It would also be desirable to be provided with such a method that can be carried out using a relatively simple equipment. Moreover, it would be desirable to be provided with an alternative to the existing technologies for producing cadmium telluride.

SUMMARY OF THE DISCLOSURE

According to one aspect, there is provided a method of producing cadmium telluride comprising:

heating a mixture comprising elemental cadmium and elemental tellurium in a reactor while passing a continuous flow of a protective gas through the reactor so as to provide a protective atmosphere in the reactor, and to provide a continuous purge flow of the protective gas in the reactor, the mixture being heated at a temperature that about 320° C. to about 950° C., and then the temperature is maintained for a first period of time, so as to obtain cadmium telluride;

optionally increasing the first temperature at a second temperature that is above about 449° C., and maintaining the second temperature for a second period of time; and cooling the cadmium telluride.

It has been found that such a method can be used so as to produce very large quantities of cadmium telluride as compared to the previously used technologies. For example, this method can result in the use of relatively large amounts of tellurium and cadmium being reacted together in relatively short periods of time so as to form cadmium telluride, without excessive pressures being developed during the process.

In the method previously mentioned, the mixture can comprise tellurium in the form of a powder. The mixture can comprise cadmium in the form of shots. For example, the cadmium shots can be formed by dropping molten cadmium onto a cooled substrate. They can have an average weight of less than about 2 g or an average weight of about 0.02 g to about 1.00 g. Alternatively, cadmium can be in the form of shavings or in the form of a powder. The shavings can have an average weight of less than about 2 g or an average weight of about 0.02 g to about 1.00 g. For example, the elemental cadmium and the elemental tellurium can be substantially uniformly distributed within the reactor before being heated. For example, the protective gas can comprise an inert gas and/or a reductive gas. The inert gas can be chosen from Ar, He, $N_2$, and mixtures thereof. The reductive gas can comprise $H_2$ or it can consist essentially of $H_2$. For example, the protective gas in the reactor can be at an absolute pressure of about 20 kPa to about 220 kPa, about 40 kPa to about 200 kPa, about 50 kPa to about 150 kPa, or about 75 kPa to about 125 kPa.

In the method previously mentioned, the reactor can comprise a furnace defining an internal chamber dimensioned to receive an open container adapted to receive the mixture. The reactor can comprise an inlet adapted to receive the protective gas, and an outlet for discharging the protective gas. The inlet and outlet can be fluid flow communication with the chamber and container. The container can comprise quartz, a ceramic material, graphite, or mixtures thereof. The container can be at least substantially semi-circular in cross-section and have an open boat shape. The container can have a length to top-width ratio which is greater than about 1.0. Alternatively, the reactor can comprise a furnace defining an internal chamber dimensioned to receive a tube, the tube defining an internal chamber adapted to receive an open container adapted to receive the mixture. The tube can comprise an inlet adapted to receive the protective gas, and an outlet for discharging the protective gas. The inlet and outlet can be in fluid flow communication with the internal chamber of the tube and the container. For example, the tube, when disposed inside the furnace, can have at least one end portion extending outside of a heating zone of the furnace or can have two end portions that are disposed outside of the furnace or outside of an heating zone of the furnace. For example, the inlet can be disposed in one of the portions and the outlet can be disposed in another of the end portions. Alternatively, both of the inlet and outlet can be disposed at same end portion. The tube can comprise quartz, or a ceramic material. The tube can comprise at least one internal surface coated with graphite. The container can comprise quartz, a ceramic material, graphite, or mixtures thereof. The container can be at least substantially semi-circular in cross-section and can have an open boat shape. The container can have a length to top-width ratio which is greater than 1.0.

The method previously mentioned, can further comprise, before inserting the elemental cadmium and the elemental tellurium in the reactor, applying a coating comprising graphite on at least one internal surface of the reactor that is adapted to contact the elemental cadmium and the elemental tellurium. For example, the coating can be applied by means of an aerosol spray comprising a graphite powder and a propellant. Alternatively, the reactor can be coated with graphite by means of a pyrolitic decomposition of a hydrocarbon.

The method previously mentioned, can further comprise, before inserting the elemental cadmium and the elemental tellurium in the container, applying a coating comprising graphite on internal surface(s) of the container that is/are adapted to contact the elemental cadmium and the elemental tellurium. For example, the coating can be applied by means of an aerosol spray comprising a graphite powder and a propellant in such a manner to provide the container with a coating that consists essentially of graphite. Alternatively, the internal surface(s) of the container can be coated with graphite by means of a pyrolitic decomposition of a hydrocarbon.

In the method previously mentioned, cooling can be carried out by means of a forced convection cooling. The cooling can be carried out by applying a forced air-cooling to an exterior surface of the tube. The cooling can be carried out inside the furnace, and after the furnace has been turned off. The mixture can have a weight of about 1 kg to about 50 kg, about 2 kg to about 40 kg, or about 5 kg to about 30 kg. Alternatively, the mixture can have a weight of at least about 1 kg, at least about 5 kg, or at least about 10 kg. The first period of time can be about 15 minutes to about 1400 minutes, about 30 minutes to about 960 minutes, about 45 minutes to about 600 minutes, or about 15 minutes to about 180 minutes. The first temperature can be about 340° C. to about 900° C., about 380° C. to about 600° C., about 325° C. to about 440° C. or about 375° C. to about 425° C. The thickness (vertically measured) of the mixture inside the reactor can be less than about 30 cm, less than about 25 cm, less than about 20 cm, less than about 15 cm, or less than about 10 cm. The method can be carried out without increasing the first temperature at the second temperature, and without maintaining the second temperature for the second period of time. Alternatively, the method can be carried out without increasing the first temperature at the second temperature, and without maintaining the second temperature for the second period of time. The second temperature can be about 449° C. to about 1100° C., about 450° C. to about 1090° C., about 460° C. to about 900° C., or about 500° C. to about 900° C. The second period of time can be about 5 minutes to about 360 minutes, about 7 minutes to about 240 minutes, or about 10 minutes to about 30 minutes.

In the method previously mentioned, the continuous flow of protective gas can be maintained during the cooling. The continuous flow of protective gas can be maintained during the first period of time. If the first temperature is increased to a second temperature, when increasing the first temperature at the second temperature and maintaining the second temperature during the second period of time, the continuous flow of protective gas can be maintained in the reactor. The continuous flow of protective gas and the protective atmosphere can be maintained in the reactor during all steps.

The expression "protective gas" as used herein refers, for example, to a gas that at least reduces the risks of oxidation of cadmium, tellurium, and cadmium telluride. For example, such a protective gas can comprise at least one inert gas (such as Ar, He, $N_2$ etc.), at least one reductive gas (such as $H_2$) or a mixture comprising at least one inert gas and at least one reductive gas.

The expression "protective atmosphere" as used herein refers, for example, to an atmosphere that will at least substantially protect cadmium, tellurium, and cadmium telluride by at least reducing the risks of oxidation of such compounds.

DETAILED DESCRIPTION OF THE DISCLOSURE

The following examples are presented in a non-limitative manner.

For example, in the method previously mentioned, several kilograms of tellurium, in powder form and having a particle size range of about sub-micron to about several hundred microns can be weighed out, as is. A corresponding amount (according to the formula CdTe, or allowing for a small excess, a few percent, of tellurium) of cadmium shots, having a typical individual shot weight range of about 0.02 g to about 1.0 g. Cadmium can also be in various other forms such shavings, powder etc. The shots can be round as would be the result of dropping molten beads of cadmium into a quenching liquid. The shots can also be flattened on one side, as would be produced from allowing molten drops of cadmium to be quenched by coming into contact with a cold plate. Other forms of cadmium, such as shavings or powder would also be expected to provide the required materials for the controlled reaction. Cadmium shots are also interesting because their use can minimize the required handling of cadmium. The lot of tellurium is then mixed with the cadmium shots so as to provide a reasonably homogeneous mixture of the two components, and the total charge is then placed in a boat-shaped container (open boat container). The container can be typically semi-circular in cross-section and can be closed at the ends so as to ensure that any liquid inside the container would be retained. For example, the length to width ratio for the container is not necessarily considered to be critical and is largely controlled by the length of the heated zone in the furnace and can be changed to accommodate different heated zone lengths. The container is designed to fit inside a tubular furnace, such that the whole charge can be heated at the same time. If not made of graphite, the container can be, for example, typically coated with a layer of graphite by means of an aerosol spray or other appropriate means, so as to form a complete layer of graphite on at least its inner surface. The cadmium and tellurium mixture can be evenly distributed along the length of the container. For example, the container can be filled to its upper rim with the mixture of cadmium and tellurium and even to above its rim, provided care is taken to ensure that the charge remains in the container. The tube, which can be fabricated from quartz and which can also be covered on its inner surface with layer of graphite, can extend beyond the furnace and the end portions can be cooled, such that seals and end plates can be used to control the atmosphere within the furnace and exclude the presence of ambient air. The tube can be substantially horizontally extending in the furnace and the container can be substantially horizontally extending in the tube. For example, is such a configuration, the cadmium and tellurium charge itself is not sealed within the container, and the charge is in atmospheric contact with the cool parts of the tube. Once charged with the reaction mixture the container is placed in the zone of the furnace that can be heated and the furnace end plates are placed on the tube such that the furnace can be sealed from the ambient atmosphere.

Once located in the tube and sealed from the ambient atmosphere, the atmosphere inside the container can be evacuated and replaced with a protective gas which can be an inert gas, a reductive gas or a mixture thereof. This gas can be allowed to continuously flow over the container, while the pressure inside the tube can be typically kept near atmospheric pressure. For example, the protective gas can be hydrogen (such as substantially pure hydrogen), an inert gas as well as various mixtures of hydrogen with at least one inert gas such as nitrogen, helium and argon. Once the protective atmosphere is present inside the furnace, the latter can be under a continuous flow of the protective gas then, the temperature inside the furnace can be programmed to rapidly increase to about 325° C. to about 440° C. This range of temperatures, about above the melting point of cadmium, but below about the melting point of tellurium, has been found to be efficient when used as the first hold-temperature period or first period of time. The temperature set point of the furnace can be maintained for the first period of time. For example, a range of hold times of about 60 to about 360 minutes can be used. After this period of time the temperature of the furnace can be rapidly increased at a second temperature of about 600° C. to about 900° C. For example, this second temperature can be maintained for a period of about 15 to about 120 minutes. After the second hold time the charge can be allowed to cool inside the tube, but with the furnace opened, so that forced air cooling can be applied to the tube and its enclosed charge, so as to decrease the required cooling time. In this way, a complete reaction cycle can be completed within a period ranging from about 2 to about 8 hours.

EXAMPLE 1

Tellurium, having a purity of at least 99.99%, was subjected to crushing and grinding so as to provide a powder form of the element having a particle size less than 200 microns. This final powder comprised the tellurium feed for the cadmium telluride reactor. Such a reactor comprises a furnace adapted to receive a tube in which a container filled with the reactants is inserted.

Cadmium, having a purity of at least 99.99%, was made into shots in an inert atmosphere, such that the frozen droplets of cadmium were produced having a weight distribution of 0.25 g plus or minus 0.2 g and a typical diameter, at the maximum point, of 4 mm. These as-formed cadmium shots comprised the feed cadmium material for the cadmium telluride reactor.

3.5 kg of tellurium powder, as described above, was placed in a plastic beaker, together with 3.0 kg of cadmium shots, as described above and the two precursors were co-mixed so as to provide a visibly uniform mixture.

A boat-shaped quartz container having a semi-circular cross-section and sealed ends, with sufficient dimensions to contain the charge, was coated with graphite. The graphite was applied as an aerosol spray, whereby the graphite combined with a carrier liquid or propellant was uniformly applied to all surfaces of the container, but more particularly to the inside parts of the container that would be in contact with the tellurium and cadmium. The propellant was then allowed to evaporate in the ambient air to leave behind a layer of graphite on the quartz container.

The mixture of tellurium powder and cadmium shots, as described above, was then uniformly distributed along the length of the container. The thickness (vertically measured) of the mixture distributed in the container was about 6 cm.

A clam-shell, tube furnace, having a heating zone length of about 10 cm longer than the overall length of the container, and a capability to accommodate a quartz tube with an inside diameter of about 2 cm larger than the outside diameter of the container, and having a capability of programmable temperature control up to temperatures of about 1100° C., was made available for the reaction process. The clam-shell feature of this furnace enables the whole of the furnace to open along its axis, allowing the tube to be observed in the position that it occupies in the furnace. Once the tube is in position, the furnace can be closed around it without disturbance of the tube or its contents. Once the heating operation is completed, the furnace can also be opened whilst still hot and forced-convection cooling applied to hasten the cooling down operation.

The end portions of the quartz tube that are extending beyond (disposed outside) the furnace and not subjected to heat, were equipped with water-cooled, stainless steel endplates that could effectively seal the tube from the atmosphere by the means of o-rings that sealed the space between the endplates and the quartz tube. The endplates were also equipped with tubes and valves that effectively enabled the quartz tube to be either evacuated (outlet) or filled (inlet) with a purge gas. Prior to use for the CdTe synthesis process, the inside surfaces of the quartz tube were also coated with graphite by the process previously described for coating the quartz container. The container containing the cadmium and tellurium charge was then located in the tube, such that it was fully in the heated zone and aligned such that the bottom of the container was in contact with the bottom part of the tube, so as to ensure that any liquid formed in the container would stay in the container and not spill over the sides.

Once inside the tube the two end portions of the tube were sealed with the cooled endplates and the tube was evacuated and purged with argon, after which it was filled with a protective gas such as high purity hydrogen. The cooling was applied to the end plates and a continuous flow of hydrogen through the tube was set to 50 cubic centimeters per minute, thereby providing the protective atmosphere in the reactor, and the continuous purge flow of the protective gas in the reactor, and more particularly inside the tube and container.

Power was then applied to the furnace, such that a hold temperature of about 400° C. (furnace temperature) was reached in about 15 minutes. This temperature set point (first temperature) was then held at about 400° C. for a period of about 165 minutes.

The temperature of the furnace was then increased to about 600° C., over a period of about 15 minutes. The temperature set point (second temperature) was maintained for a further period of about 15 minutes.

At the end of this time, the furnace was opened and forced air-cooling was applied to the exterior of the tube, so as to reduce the cooling period. The continuous flow of protective gas that provides the protective atmosphere and the continuous purge flow was maintained during all the above-mentioned steps including the cooling. Once a temperature was reached whereby the contents of the tube could be safely handled, over a period of about 90 minutes, the flow of hydrogen was stopped, and the tube was evacuated and purged with argon. Then, the cooled endplates were removed and the contents of the tube were removed from the furnace.

EXAMPLE 2

A similar example was carried out by using approximately the same general method previously mentioned in Example 1. However, in Example 2, larger quantities of starting material or precursors were used i.e. 8.7 kg of tellurium powder and 7.6 kg of cadmium shots. The thickness of the mixture of these two precursors in the container was about 10 cm. Moreover, in Example 2, there was no heating at a second temperature. The power was applied to the furnace, such that a hold temperature of about 440° C. (furnace temperature) was reached and then, this temperature set point (first temperature) was then held at about 440° C. for a period of about 75 minutes. The cooling was then applied for a period of about 70 minutes after the end of this 75 minutes period of time.

During the whole of the above examples, there was no excessive pressure generation in the tube at any point in time. The resulting CdTe product was easily removed from the container as a form of an ingot which can eventually be transformed into a powder if desired. A metal precursor conversion yield of 90% or better was achieved.

It was thus showed that the method disclosed in this document is effective for producing large quantities of cadmium telluride in a few hours. For example, in this method, use can be made of a mixture of cadmium and tellurium, an atmosphere that can be both reducing and thermally conductive and a heating profile that has been shown to not result in uncontrolled and high pressure conditions.

The present disclosure has been described with regard to specific examples. The description was intended to help the understanding of the disclosure, rather than to limit its scope. It will be apparent to one skilled in the art that various modifications may be made to the disclosure without departing from the scope of the disclosure as described herein, and such modifications are intended to be covered by the present document.

The invention claimed is:

1. A method of producing cadmium telluride comprising:
heating a mixture comprising elemental cadmium and elemental tellurium in a reactor while passing a continuous flow of a protective gas through said reactor so as to provide a protective atmosphere in said reactor, and to provide a continuous purge flow of said protective gas in said reactor, said mixture being heated at a first temperature of about 320° C. to about 950° C., and then said first temperature is maintained for a first period of time, so as to obtain cadmium telluride;
optionally increasing said first temperature at a second temperature that is above about 449° C., and maintaining said second temperature for a second period of time; and
cooling said cadmium telluride.

2. The method of claim 1, wherein said mixture comprises a tellurium powder and cadmium shots.

3. The method of claim 1, wherein said protective gas comprises an inert gas.

4. The method of claim 1, wherein said protective gas comprises a reductive gas.

5. The method of claim 4, wherein said reductive gas comprises $H_2$.

6. The method of claim 1, wherein said protective gas consists essentially of $H_2$.

7. The method of claim 1, wherein said protective gas in said reactor is at an absolute pressure of about 20 kPa to about 220 kPa.

8. The method of claim 1, wherein said protective gas in said reactor is at an absolute pressure of about 75 kPa to about 125 kPa.

9. The method of claim 1, further comprising, before inserting said elemental cadmium and said elemental tellurium in said reactor, applying a coating comprising graphite on at least one internal surface of said reactor that is adapted to contact said elemental cadmium and said elemental tellurium.

10. The method of claim 1, wherein said cooling is carried out by means of a forced convection cooling.

11. The method of claim 1, wherein during said method, said continuous flow of protective gas and said protective atmosphere are maintained in said reactor during all steps.

12. The method of claim 1, wherein said first temperature is about 340° C. to about 900° C.

13. The method of claim 1, wherein said first temperature is about 375° C. to about 425° C.

14. The method of claim 12, wherein said first period of time is about 15 minutes to about 1400 minutes.

15. The method of claim 13, wherein said first period of time is about 15 minutes to about 180 minutes.

16. The method of claim 12, wherein said first temperature is increased to said second temperature that is above 449° C., and said second temperature is maintained for said second period of time.

17. The method of claim 16, wherein said second temperature is about 449° C. to about 1100° C.

18. The method of claim 13, wherein said second temperature is about 460° C. to about 900° C.

19. The method of claim 17, wherein said second period of time is about 5 minutes to about 360 minutes.

20. The method of claim 1, wherein said method is carried out without increasing said first temperature at said second temperature, and without maintaining said second temperature for said second period of time.

21. The method of claim 20, wherein said first temperature is about 380° C. to about 600° C.

22. The method of claim 1, wherein said first temperature is about 380° C. to about 600° C.

23. The method of claim 1, wherein said mixture comprises tellurium in powder form and cadmium in powder form.

24. The method of claim 1, wherein said mixture comprises tellurium in powder form and cadmium in a form of shots or shavings.

25. The method of claim 1, wherein said mixture comprises tellurium in solid form and cadmium in solid form, said first temperature is about 375° C. to about 425° C., and said first temperature being increased to said second temperature that is about 500° C. to about 900° C.

26. The method of claim 1, wherein said first temperature is about 375° C. to about 425° C. and is maintained for said first period of time which is about 15 minutes to about 180 minutes, said first temperature being then increased to said second temperature that is about 500° C. to about 900° C., and said second temperature is maintained for said second period of time which is about 10 minutes to about 30 minutes.

27. The method of claim 1, wherein said mixture comprises tellurium in solid form and cadmium in solid form, said first temperature is about 380° C. to about 600° C., and wherein said method is carried out without increasing said first temperature at said second temperature, and without maintaining said second temperature for said second period of time.

28. The method of claim 1, wherein said first temperature is about 380° C. to about 600° C. and is maintained for said first period of time which is about 15 minutes to about 180 minutes, and wherein said method is carried out without increasing said first temperature at said second temperature, and without maintaining said second temperature for said second period of time.

29. The method of claim 1, wherein said method is carried out in said reactor in a single chamber.

30. The method of claim 18, wherein said method is carried out in said reactor in a single chamber.

31. The method of claim 1, further comprising, before inserting said elemental cadmium and said elemental tellurium in said reactor, applying a coating comprising graphite on at least one internal surface of said reactor that is adapted to contact said elemental cadmium and said elemental tellurium, wherein said reactor comprises a boat-shaped quartz container adapted to receive said elemental cadmium and said elemental tellurium and comprising said at least one surface; and a tube furnace adapted to receive said quartz container.

32. The method of claim 31, wherein said coating is applied by means of an aerosol spray comprising a graphite powder and a propellant.

33. The method of claim 31, wherein said reactor is coated with graphite by means of a pyrolitic decomposition of a hydrocarbon.

* * * * *